US012158725B2

(12) United States Patent
Kato et al.

(10) Patent No.: US 12,158,725 B2
(45) Date of Patent: Dec. 3, 2024

(54) TONER

(71) Applicant: CANON KABUSHIKI KAISHA, Tokyo (JP)

(72) Inventors: Mai Kato, Tokyo (JP); Hirofumi Kyuushima, Tokyo (JP); Naoya Isono, Shizuoka (JP); Kenichi Nakayama, Shizuoka (JP); Yoshiaki Shiotari, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 348 days.

(21) Appl. No.: 17/515,869

(22) Filed: Nov. 1, 2021

(65) Prior Publication Data

US 2022/0146954 A1 May 12, 2022

(30) Foreign Application Priority Data

Nov. 6, 2020 (JP) ................................ 2020-185497

(51) Int. Cl.

*G03G 9/097* (2006.01)
*G03G 9/08* (2006.01)
*G03G 9/093* (2006.01)

(52) U.S. Cl.

CPC ....... *G03G 9/09708* (2013.01); *G03G 9/0821* (2013.01); *G03G 9/0825* (2013.01); *G03G 9/09328* (2013.01); *G03G 9/09371* (2013.01)

(58) Field of Classification Search

CPC ............. G03G 9/09708; G03G 9/0821; G03G 9/0825; G03G 9/09328; G03G 9/09371
See application file for complete search history.

(56) References Cited

U.S. PATENT DOCUMENTS

| | | | |
|---|---|---|---|
| 4,802,977 | A | 2/1989 | Kanda et al. |
| 4,844,349 | A | 7/1989 | Kanda et al. |
| 5,016,823 | A | 5/1991 | Kato et al. |
| 5,111,998 | A | 5/1992 | Kanda et al. |
| 5,270,143 | A | 12/1993 | Tomiyama et al. |
| 5,319,424 | A | 6/1994 | Tomiyama et al. |
| 5,338,638 | A | 8/1994 | Tsuchiya et al. |
| 5,364,720 | A | 11/1994 | Nakazawa et al. |
| 5,424,810 | A | 6/1995 | Tomiyama et al. |
| 5,447,815 | A | 9/1995 | Kato et al. |
| 5,489,498 | A | 2/1996 | Ohno et al. |
| 5,712,075 | A | 1/1998 | Mitsumura et al. |
| 5,753,396 | A | 5/1998 | Nakamura et al. |
| 5,854,365 | A | 12/1998 | Ohno et al. |
| 5,931,306 | A | 8/1999 | Mitsumura et al. |
| 6,207,339 | B1 | 3/2001 | Kato et al. |
| 6,316,157 | B1 | 11/2001 | Yoshikawa et al. |
| 6,346,356 | B1 | 2/2002 | Ohno et al. |
| 7,112,393 | B2 | 9/2006 | Komoto et al. |
| 7,153,625 | B2 | 12/2006 | Kaburagi et al. |
| 7,241,546 | B2 | 7/2007 | Moriki et al. |
| 7,387,860 | B2 | 6/2008 | Moriki et al. |
| 7,846,631 | B2 | 12/2010 | Katsuta et al. |
| 8,223,726 | B2 | 7/2012 | Zendle et al. |
| 8,288,069 | B2 | 10/2012 | Fujikawa et al. |
| 8,367,289 | B2 | 2/2013 | Isono et al. |
| 8,440,382 | B2 | 5/2013 | Isono et al. |
| 8,497,054 | B2 | 7/2013 | Sugiyama et al. |
| 8,652,737 | B2 | 2/2014 | Handa et al. |
| 8,778,581 | B2 | 7/2014 | Nonaka et al. |
| 8,822,120 | B2 | 9/2014 | Abe et al. |
| 8,828,639 | B2 | 9/2014 | Kamikura et al. |
| 8,841,056 | B2 | 9/2014 | Yoshizaki et al. |
| 8,986,914 | B2 | 3/2015 | Fujikawa et al. |
| 9,034,549 | B2 | 5/2015 | Shiotari et al. |
| 9,158,216 | B2 | 10/2015 | Shimano et al. |
| 9,256,148 | B2 | 2/2016 | Fujikawa et al. |
| 9,261,806 | B2 | 2/2016 | Moribe et al. |
| 9,285,697 | B2 | 3/2016 | Fukudome et al. |
| 9,329,507 | B2 | 5/2016 | Watanabe |
| 9,377,705 | B2 | 6/2016 | Shimano et al. |
| 9,383,668 | B2 | 7/2016 | Noji et al. |
| 9,500,972 | B2 | 11/2016 | Tanaka et al. |
| 9,575,424 | B2 | 2/2017 | Nakagawa et al. |

(Continued)

FOREIGN PATENT DOCUMENTS

| | | | |
|---|---|---|---|
| CN | 101339372 | A | 1/2009 |
| CN | 105278271 | A | 1/2016 |
| CN | 105739253 | A | 7/2016 |
| CN | 106033176 | A | 10/2016 |
| JP | 2006-267527 | A | 10/2006 |
| JP | 2008-58620 | A | 3/2008 |
| JP | 2010-139696 | A | 6/2010 |
| JP | 2013-19971 | A | 1/2013 |
| JP | 2014-164274 | A | 9/2014 |

(Continued)

OTHER PUBLICATIONS

U.S. Appl. No. 18/327,506, Masaya Komuro, filed Jun. 1, 2023.

(Continued)

*Primary Examiner* — Peter L Vajda
*Assistant Examiner* — Boone Alexander Evans
(74) *Attorney, Agent, or Firm* — VENABLE LLP

(57) ABSTRACT

A toner comprises a toner particle comprising a core particle comprising a resin component, a shell coating the surface of the core particle, and a polyvalent metal. The resin component comprises a polyester resin, and the shell comprises an amino resin; in an electron image of a cross section of the toner acquired using a transmission electron microscope, a polyvalent metal content P(M) obtained by energy-dispersive x-ray analysis at the core/shell interface and in the vicinity of this interface is 0.0010 to 2.00 atomic %; and the surface storage elastic modulus of the toner at a load of 30 μN at 25° C., according to nanoindentation measurement of the toner, is from 6.50 GPa to 12.00 GPa.

11 Claims, No Drawings

(56) References Cited

U.S. PATENT DOCUMENTS

| | | | |
|---|---|---|---|
| 9,594,323 B2 | 3/2017 | Fujikawa et al. | |
| 9,599,919 B2 | 3/2017 | Isono et al. | |
| 9,658,549 B2 | 5/2017 | Tanaka et al. | |
| 9,785,068 B2 | 10/2017 | Umeda et al. | |
| 9,785,071 B2 | 10/2017 | Shimano et al. | |
| 9,829,816 B2 | 11/2017 | Tanaka et al. | |
| 9,835,964 B2 | 12/2017 | Yoshida et al. | |
| 9,904,193 B2 | 2/2018 | Nakagawa et al. | |
| 9,921,501 B2 | 3/2018 | Mochizuki et al. | |
| 9,958,801 B2 | 5/2018 | Tanaka et al. | |
| 10,078,279 B2 | 9/2018 | Nakagawa et al. | |
| 10,101,681 B2 | 10/2018 | Tagawa et al. | |
| 10,216,107 B2 | 2/2019 | Tsubaki et al. | |
| 10,747,136 B2 | 8/2020 | Kenmoku et al. | |
| 10,948,839 B2 | 3/2021 | Tsubaki et al. | |
| 11,086,242 B2 | 8/2021 | Isono et al. | |
| 11,112,710 B2 | 9/2021 | Nakayama et al. | |
| 11,112,714 B2 | 9/2021 | Amano et al. | |
| 11,397,386 B2 | 7/2022 | Kyuushima et al. | |
| 2008/0057434 A1 | 3/2008 | Itoh | |
| 2009/0011357 A1 | 1/2009 | Kawase | |
| 2009/0258310 A1* | 10/2009 | Matsumoto .......... | G03G 9/0819 430/110.3 |
| 2010/0035171 A1 | 2/2010 | Watanabe et al. | |
| 2013/0011777 A1 | 1/2013 | Aoki et al. | |
| 2015/0248072 A1 | 9/2015 | Katsuta et al. | |
| 2016/0026120 A1 | 1/2016 | Hasegawa | |
| 2016/0070187 A1 | 3/2016 | Kawamoto | |
| 2016/0187797 A1 | 6/2016 | Kosaki | |
| 2016/0342102 A1* | 11/2016 | Hori ..................... | G03G 9/0821 |
| 2017/0010552 A1 | 1/2017 | Sumioka | |
| 2017/0123333 A1 | 5/2017 | Kuroki et al. | |
| 2017/0307991 A1 | 10/2017 | Kadonome | |
| 2020/0363742 A1 | 11/2020 | Kyuushima et al. | |
| 2021/0311405 A1 | 10/2021 | Shiotari et al. | |
| 2021/0318631 A1 | 10/2021 | Isono et al. | |
| 2022/0075284 A1 | 3/2022 | Nakayama et al. | |
| 2022/0128918 A1 | 4/2022 | Kototani et al. | |
| 2022/0146953 A1 | 5/2022 | Kyuushima et al. | |
| 2022/0390870 A1 | 12/2022 | Kyuushima et al. | |
| 2022/0390871 A1 | 12/2022 | Isono et al. | |
| 2022/0397836 A1 | 12/2022 | Toyoda et al. | |
| 2022/0404730 A1 | 12/2022 | Nagaoka et al. | |
| 2022/0413407 A1 | 12/2022 | Inoue et al. | |

FOREIGN PATENT DOCUMENTS

| | | |
|---|---|---|
| JP | 2015-22230 A | 2/2015 |
| JP | 2015-45844 A | 3/2015 |
| JP | 2015-49267 A | 3/2015 |
| JP | 2015-60141 A | 3/2015 |
| JP | 2018-54891 A | 4/2018 |
| WO | 2015/129448 A1 | 9/2015 |

OTHER PUBLICATIONS

Hu et al., Development of Multifunctional Aids for Paper—Core-shell Structure Polymer Particles, World Pulp and Paper, vol. 24, No. 4 (2005) 16-26.

* cited by examiner

TONER

BACKGROUND OF THE INVENTION

Field of the Invention

The present disclosure relates to the toner used to form a toner image by the development of the electrostatic latent image formed by a method such as electrophotography, electrostatic recording, and toner jet system recording methods.

Description of the Related Art

Methods in which image information is visualized via an electrostatic latent image, e.g., electrophotography, have come to be used in diverse sectors in recent years, and copier and printer downsizing, greater energy efficiencies, and longer life are also being required, along with higher image quality and higher speeds.

Among these considerations, reductions in the running costs of copiers and printers are strongly desired. There is, as a consequence, demand for an excellent energy efficiency as well as a long life that would enable extended printing from a single cartridge. Within the realm of energy efficiency, a binder resin having a low melting point or glass transition temperature, and/or a low-melting release agent, is often used to prepare toner that exhibits an excellent low-temperature fixability, which in turn enables a reduction in the power used during thermal fixing. When such a toner is stored at high temperatures, the problem can arise that toner-to-toner melt-bonding readily occurs.

In response to this problem, for example, Japanese Patent Application Laid-open No. 2015-045844 discloses a core-shell toner that uses a thermosetting resin and a thermoplastic resin in the shell layer.

However, toner/toner contact and toner/member contact accompany all of the operations in the series of operations associated with the image-formation process in which an electrostatic latent image is visualized using toner, and the toner is thus repetitively subjected to loading to the degree that such contact occurs. As a consequence, the problem arises that the toner subjected to such heat and stress undergoes deformation and cracking and crushing of the toner occurs.

To respond to this problem, for example, Japanese Patent Application Laid-open No. 2014-164274 proposes a toner in which the surface hardness and displacement measured using a nanoindentation method have been brought into prescribed ranges.

SUMMARY OF THE INVENTION

However, low-temperature fixability and development durability are opposing properties, and it has been found that reconciling the requirements of modern design concepts is difficult. With regard to long-life developing systems, it was found that, when repetitive printing is done continuously using the aforementioned toner, the shell in the core-shell toner ends up exfoliating from the core particle.

When the shell exfoliates from the core particle, image defects are ultimately produced due to perturbations in the charging performance and because the exfoliated shell and exposed core particle contaminate or melt-bond to the members involved with image formation, i.e., the development member and charging member. There is thus still room for improvement with regard to durability.

The present disclosure provides a toner that exhibits an excellent long-term developing performance achieved through a suppression of shell exfoliation, while also exhibiting retention of and improvement in the low-temperature fixability.

The present disclosure relates to a toner comprising a toner particle comprising a core particle comprising a resin component, a shell coating a surface of the core particle, and a polyvalent metal, wherein the resin component comprises a polyester resin;

the shell comprises an amino resin;

in an electron image of a cross section of the toner particle acquired using a transmission electron microscope, a content P(M) of the polyvalent metal is 0.0010 to 2.0000 atomic %, the content P(M) being obtained by energy-dispersive x-ray analysis during an execution of a line scan in a range of 0.85d to 1.15d from an outline of the cross section of the toner particle toward a central part of the cross section in a direction perpendicular to the outline, the d being a thickness (nm) of the shell; and a surface storage elastic modulus of the toner at a load of 30 μN at 25° C., according to nanoindentation measurement of the toner, is 6.50 to 12.00 GPa.

Advantageous Effects of Invention

The present disclosure can thus provide a toner that exhibits an excellent long-term developing performance achieved through a suppression of shell exfoliation, while also exhibiting retention of and improvement in the low-temperature fixability. Further features of the present invention will become apparent from the following description of exemplary embodiments.

DESCRIPTION OF THE EMBODIMENTS

Further, in the present disclosure, the expression of "from XX to YY" or "XX to YY" indicating a numerical range means a numerical range including a lower limit and an upper limit which are end points, unless otherwise specified. When numerical value ranges are provided in stages, the upper limits and lower limits of the individual numerical value ranges may be combined in any combination.

The present disclosure relates to a toner comprising a toner particle comprising a core particle comprising a resin component, a shell coating a surface of the core particle, and a polyvalent metal, wherein the resin component comprises a polyester resin;

the shell comprises an amino resin;

in an electron image of a cross section of the toner particle acquired using a transmission electron microscope, a content P(M) of the polyvalent metal is 0.0010 to 2.0000 atomic %, the content P(M) being obtained by energy-dispersive x-ray analysis during an execution of a line scan in a range of 0.85d to 1.15d from an outline of the cross section of the toner particle toward a central part of the cross section in a direction perpendicular to the outline, the d being a thickness (nm) of the shell; and a surface storage elastic modulus of the toner at a load of 30 μN at 25° C., according to nanoindentation measurement of the toner, is 6.50 to 12.00 GPa.

In this toner, polyvalent metal is present at the core particle/shell interface and in the vicinity of this interface and the adherence between the core particle and the shell is increased. Due to this, even in the case of a high storage elastic modulus for the toner surface with a soft core particle that exhibits low-temperature fixability, the adherence between the core particle and shell is high and shell exfoliation can be suppressed. This can satisfy, for long-life development systems, the high expectations for toner developing performance while maintaining low-temperature fixability.

The present inventors believe the following with regard to the reasons such effects are obtained by this toner.

In order to satisfy the high expectations for the toner developing performance in long-life development systems, the surface storage elastic modulus of the toner at a load of 30 μN at 25° C. in a nanoindentation measurement of the toner must be from 6.50 GPa to 12.00 GPa. The storage elastic modulus of the toner surface represents the storage elastic modulus of the surfacemost layer of the toner, and investigations by the present inventors have shown that it correlates with the development durability.

As previously noted, toner undergoes cracking and crushing due to the toner repetitively receiving stress from members, e.g., the developing roller and developing blade, during development. Inorganic or organic fine particles, referred to as external additive, may also be externally added to the toner on an optional basis with the goal of charging assistance and flowability improvement.

By having the aforementioned surface storage elastic modulus be at least 6.50 GPa, the occurrence of cracking and crushing of the toner is suppressed even when stress is repeatedly applied from the exterior. In addition, a toner having an excellent development durability is provided because the external additive effectively acts on a long-term basis.

By having the aforementioned surface storage elastic modulus be not more than 12.00 GPa, the external additive can then be suitably fixed and the toner is resistant to deformation, and a toner having an excellent development durability—and which is capable of suppressing image defects, i.e., fogging and development streaks—is provided because the external additive effectively acts on a long-term basis.

The surface storage elastic modulus is preferably from 6.80 GPa to 11.60 GPa. A toner having an even better development durability is provided by satisfying this range.

The surface storage elastic modulus for a load of 30 μN can be controlled using the glass transition temperature Tg and acid value of the resin at the toner surface and using the amount of metal ion at the core particle/shell interface and in the vicinity of this interface.

The shell contains amino resin in order to satisfy the aforementioned expectations for the developing performance of the toner.

The amino resin can be exemplified by melamine resins, guanamine resins, aniline resins, urea resins, polyurethane resins, sulfonamide resins, polyimide resins, and derivatives of these resins. The amino resin is preferably a thermosetting resin.

Suitable examples of thermosetting monomer that can be used for the amino resin are methylolmelamine, hexamethylolmelamine, melamine, methylolated urea (specifically, for example, dimethyloldihydroxyethyleneurea), urea, benzoguanamine, acetoguanamine, and spiroguanamine.

The amino resin is more preferably at least one selected from the group consisting of melamine resins, urea resins, guanamine resins, and aniline resins, and melamine resins are more preferred.

The melamine resin is preferably a methylolmelamine resin, hexamethylolmelamine resin, or methoxymethylolmelamine resin. Hexamethylolmelamine resin is more preferred.

The thermosetting resin is obtained by causing at least one thermosetting monomer to undergo a crosslinking reaction. This thermosetting monomer is a monomer that has a crosslinking capability. For example, when a thermosetting resin is provided by a three-dimensional linkage between monomers of the same species via "$-CH_2-$", this monomer corresponds to a thermosetting monomer.

Thermosetting resins exhibit an excellent heat resistance and are resistant to deformation, and it is thought that as a result, when a thermosetting resin is used in the shell, the toner is resistant to deformation even when external stress is applied and the image defects of fogging and development streaks can be suppressed.

It is thought that melamine resin in particular, since it is a polycondensate of melamine, in which three amino groups are bonded to a triazine skeleton, provides an even stronger three-dimensional network structure.

In addition, a surface storage elastic modulus of the toner at a load of 50 μN at 25° C., according to nanoindentation measurement of the toner, is preferably from 0.20 GPa to 12.00 GPa. From 0.30 GPa to 11.80 GPa is more preferred.

Nanoindentation measurement using a load of 50 μN measures the viscoelasticity in a region closer to the core of the toner particle than does measurement using a load of 30 μN. By having the surface storage elastic modulus of the toner particle at 50 μN be in the indicated range, a toner is provided that exhibits an excellent low-temperature fixability, with little impairment of fixing, while also exhibiting a high development durability. The surface storage elastic modulus at a load of 50 μN can be controlled using the Tg and acid value of the resin in the core particle and the amount of metal ion.

The shell has an average value of the thickness of 1.0 nm to 30.0 nm. In the toner fixing step, fixing on paper is effected through the application of heat and pressure from a member such as a fixing roller. A toner having an excellent low-temperature fixability is provided by having the shell thickness be not more than 30.0 nm.

Cracking and crushing of the toner occurs due to the stress that is repeatedly applied to the toner during development. Having the shell thickness be at least 1.0 nm provides a toner for which toner deterioration is restrained. The shell has the average value of the thickness of 1.1 nm to 29.0 nm.

The entire surface of the core particle need not be coated by the shell, and portions may be present where the core particle is partially exposed.

In order to bring about both low-temperature fixability and a high development durability in a toner that exhibits low-temperature fixability, improving the core particle/shell adherence is critical and polyvalent metal is required as a consequence.

In an electron image of a cross section of the toner particle acquired using a transmission electron microscope, a content P(M) of the polyvalent metal content is 0.0010 to 2.0000 atomic %, the content P(M) being obtained by energy-dispersive x-ray analysis during an execution of a line scan in a range of 0.85d to 1.15d from an outline of the cross section of the toner particle toward a central part of the cross section in a direction perpendicular to the outline, the d being a thickness (nm) of the shell.

Using d (nm) for the shell thickness, the range of 0.85d to 1.15d from an outline of the cross section of the toner particle toward a central part of the cross section in the direction perpendicular to the outline, indicates the core particle/shell interface and the neighborhood of this interface.

It is thought that in a toner particle that satisfies the preceding, the shell and core particle are attached to each other by noncovalent bonds due to the polyvalent metal. By having P(M) be at least 0.0010 atomic %, the core particle can be satisfactorily adhered to the shell and shell exfoliation with respect to external forces can be suppressed.

By having P(M) be not more than 2.0000 atomic %, due to a suitable attachment, impact forces are dissipated due to the exhibition of a certain viscosity and a cracking-resistant toner is thus provided. P(M) is preferably from 0.0012 atomic % to 1.9400 atomic %. P(M) can be controlled using the amount of addition of the polyvalent metal ion.

The polyvalent metal preferably is at least one selected from the group consisting of Al, Ca, and Mg. A single one of these metals may be used by itself or a plurality may be used in combination. These metals are at least divalent metals and strengthen the crosslinking between the core and shell. At least one selected from the group consisting of Ca and Al, which have small ionic radii, is more preferred, and Al, which is a trivalent metal, is still more preferred.

Ca and Al, which have small ionic radii, strongly attract crosslinking segments in the core and shell and as a consequence provide stronger crosslinking and provide a toner with a high adherence. Moreover, due to the increase in the crosslinking points between the core and shell due to the trivalent metal, stronger crosslinking is provided and a toner with a high adherence is provided.

Preferably the polyvalent metal is Mg derived from magnesium hydroxide, Mg derived from magnesium chloride, or Al derived from aluminum sulfate.

Through the addition of such a metal salt as an aggregating agent in the emulsion aggregation method, or its addition to the aqueous medium in the dissolution suspension method, or its addition to an aqueous medium for core particle dispersion, the desired polyvalent metal can be incorporated at the core particle/shell interface or in the vicinity thereof.

It is an essential requirement for improving the adherence with the shell resin through the interaction described above that the resin component of the core particle contain polyester resin. The polyester resin preferably is a polycondensate between an alcohol component and a carboxylic acid component.

The polyester resin undergoes orientation to the outermost surface when a polyester resin is used in the resin component of the core particle. When a water-soluble salt of an at least divalent metal is added in this state in which the polyester resin is present at the outermost surface, the water-soluble metal salt dissolves in the aqueous medium, thereby providing an at least divalent metal ion.

The polyester resin contains the carboxy group. It is thought that the at least divalent metal ion coordinates to the carboxy groups in the polyester resin. When an amino resin is used in the shell, the element nitrogen engages in noncovalent bonding with the metal ion coordinated to the carboxy groups in the polyester resin, making possible an improved core particle/shell adherence due to intermolecular interaction.

This improvement in adherence enables a suppression of shell exfoliation even during long-term use. The suppression of shell exfoliation provides a toner that exhibits an excellent durability and that also exhibits a long-term suppression of the image defects of fogging and streaking.

The resin component of the core particle preferably contains at least 50.0 mass % polyester resin in the resin component. When this polyester resin is at least 50.0 mass % of the resin component of the core, the adherence between the core and shell is improved and shell exfoliation is suppressed even during long-term use. At least 55.0 mass % is more preferred and at least 60.0 mass % is still more preferred. The upper limit is not particularly limited, but not more than 98.0 mass % is preferred and not more than 95.0 mass % is more preferred.

For example, polyester resin, polycarbonate resin, phenolic resin, epoxy resin, polyamide resin, cellulose resin, and styrene-acrylic resin can be used for the resin component of the core particle.

The alcohol component can be exemplified by ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, cyclohexanedimethanol, butenediol, octenediol, cyclohexenedimethanol, hydrogenated bisphenol A, ethylene oxide adducts on bisphenol A, and propylene oxide adducts on bisphenol A.

Polybasic carboxylic acids can be exemplified by aromatic dicarboxylic acids such as phthalic acid, isophthalic acid, and terephthalic acid, and their anhydrides; alkyl dicarboxylic acids such as succinic acid, adipic acid, sebacic acid, and azelaic acid, and their anhydrides; succinic acid substituted by an alkyl group or alkenyl group having from 6 to 18 carbons, and anhydrides thereof; and unsaturated dicarboxylic acids such as fumaric acid, maleic acid, and citraconic acid, and their anhydrides.

Resin Component of the Core Particle

The resin component of the core particle should contain polyester resin, and may contain another resin in combination with this.

The following resins are provided as examples: homopolymers of styrene and its substituted forms, e.g., polystyrene, poly-p-chlorostyrene, and polyvinyltoluene; styrene copolymers, e.g., styrene-p-chlorostyrene copolymer, styrene-vinyltoluene copolymer, styrene-vinylnaphthalene copolymer, styrene-acrylate ester copolymer, styrene-methacrylate ester copolymer, styrene-methyl alpha-chloromethacrylate copolymer, styrene-acrylonitrile copolymer, styrene-vinyl methyl ether copolymer, styrene-vinyl ethyl ether copolymer, styrene-vinyl methyl ketone copolymer, and styrene-acrylonitrile-indene copolymer; as well as polyvinyl chloride, phenolic resins, natural resin-modified phenolic resins, natural resin-modified maleic acid resins, acrylic resins, methacrylic resins, polyvinyl acetate, silicone resins, polyurethane resins, polyamide resins, furan resins, epoxy resins, xylene resins, polyvinyl butyral, terpene resins, coumarone-indene resins, and petroleum resins.

The resin component of the core particle preferably contains styrene-acrylic resin in addition to polyester resin. The content of the styrene-acrylic resin in the resin component is preferably from 2.0 mass % to 50.0 mass % and is more preferably from 5.0 mass % to 45.0 mass %.

The acid value of the polyester resin is preferably from 1 mg KOH/g to 50 mg KOH/g from the standpoint of the stability of the triboelectric charge quantity. This acid value can be brought into the indicated range by adjusting the type and amount of incorporation of the monomer used for the resin. Specifically, this acid value can be controlled by adjusting the molecular weight and the alcohol monomer component ratio/acid monomer component ratio in resin production.

A crystalline polyester resin may also be used as the resin component in the core particle.

Colorant

A colorant may be used in the toner.

The colorant can be exemplified by the following.

Black colorants can be exemplified by carbon black and by colorants provided by color mixing using a yellow colorant, magenta colorant, and cyan colorant to give a black color. A pigment may be used by itself for the colorant; however, the use of a dye/pigment combination brings about an improved sharpness and is thus more preferred from the standpoint of the quality of the full-color image.

Magenta-colored pigments can be exemplified by the following: C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, and 282; C. I. Pigment Violet 19; and C. I. Vat Red 1, 2, 10, 13, 15, 23, 29, and 35.

Magenta-colored dyes can be exemplified by the following: oil-soluble dyes such as C. I. Solvent Red 1, 3, 8, 23, 24, 25, 27, 30, 49, 81, 82, 83, 84, 100, 109, and 121, C. I. Disperse Red 9, C. I. Solvent Violet 8, 13, 14, 21, and 27, and C. I. Disperse Violet 1; and basic dyes such as C. I. Basic Red 1, 2, 9, 12, 13, 14, 15, 17, 18, 22, 23, 24, 27, 29, 32, 34, 35, 36, 37, 38, 39, and 40 and C. I. Basic Violet 1, 3, 7, 10, 14, 15, 21, 25, 26, 27, and 28.

Cyan-colored pigments can be exemplified by the following: C. I. Pigment Blue 2, 3, 15:2, 15:3, 15:4, 16, and 17; C. I. Vat Blue 6; C. I. Acid Blue 45; and copper phthalocyanine pigments in which 1 to 5 phthalimidomethyl groups are substituted on the phthalocyanine skeleton.

Cyan-colored dyes can be exemplified by C. I. Solvent Blue 70.

Yellow-colored pigments can be exemplified by the following: C. I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, and 185, and C. I. Vat Yellow 1, 3, and 20.

Yellow-colored dyes can be exemplified by C. I. Solvent Yellow 162.

The amount of use of the colorant is preferably from 0.1 mass parts to 30.0 mass parts per 100.0 mass parts of the binder resin.

Wax

The toner preferably contains a wax. The wax can be exemplified by the following:

hydrocarbon waxes such as low molecular weight polyethylene, low molecular weight polypropylene, alkylene copolymers, microcrystalline wax, paraffin wax, and Fischer-Tropsch waxes; oxides of hydrocarbon waxes, such as oxidized polyethylene wax, and their block copolymers; waxes in which the major component is fatty acid ester, such as carnauba wax; and waxes provided by the partial or complete deacidification of fatty acid esters, such as deacidified carnauba wax.

Additional examples are as follows: saturated straight-chain fatty acids such as palmitic acid, stearic acid, and montanic acid; unsaturated fatty acids such as brassidic acid, eleostearic acid, and parinaric acid; saturated alcohols such as stearyl alcohol, aralkyl alcohols, behenyl alcohol, carnaubyl alcohol, ceryl alcohol, and melissyl alcohol; polyhydric alcohols such as sorbitol; esters between a fatty acid such as palmitic acid, stearic acid, behenic acid, or montanic acid and an alcohol such as stearyl alcohol, aralkyl alcohol, behenyl alcohol, carnaubyl alcohol, ceryl alcohol, or melissyl alcohol; fatty acid amides such as linoleamide, oleamide, and lauramide; saturated fatty acid bisamides such as methylenebisstearamide, ethylenebiscapramide, ethylenebislauramide, and hexamethylenebisstearamide; unsaturated fatty acid amides such as ethylenebisoleamide, hexamethylenebisoleamide, N,N'-dioleyladipamide, and N,N'-dioleylsebacamide; aromatic bisamides such as m-xylenebisstearamide and N,N'-distearylisophthalamide; fatty acid metal salts (generally known as metal soaps) such as calcium stearate, calcium laurate, zinc stearate, and magnesium stearate; waxes provided by grafting an aliphatic hydrocarbon wax using a vinyl monomer such as styrene or acrylic acid; partial esters between a fatty acid and a polyhydric alcohol, such as behenyl monoglyceride; and hydroxyl group-containing methyl ester compounds obtained by the hydrogenation of plant oils.

Among these waxes, hydrocarbon waxes, e.g., paraffin waxes, Fischer-Tropsch waxes, and so forth, are preferred from the standpoint of improving the low-temperature fixability.

The content of the wax is preferably from 0.5 mass parts to 25.0 mass parts per 100.0 mass parts of the binder resin.

Viewed from the standpoint of the coexistence of the toner storability with its resistance to hot offset, the peak temperature of the maximum endothermic peak for the wax that is present in the temperature range from 30° C. to 200° C. in the endothermic curve during ramp up as measured with a differential scanning calorimeter (DSC) is preferably from 50° C. to 110° C.

Charge Control Agent

A charge control agent may also be incorporated in the toner on an optional basis. A known charge control agent can be used for the charge control agent, but metal compounds of aromatic carboxylic acids that are colorless, provide a high toner charging speed, and can maintain a stable and constant amount of charge are particularly preferred.

Negative-charging charge control agents can be exemplified by the following: metal salicylate compounds, metal naphthoate compounds, metal dicarboxylate compounds, polymer compounds having sulfonic acid or carboxylic acid in side chain position, polymer compounds having a sulfonate salt or sulfonate ester in side chain position, polymer compounds having a carboxylate salt or carboxylate ester in side chain position, boron compounds, urea compounds, silicon compounds, and calixarene.

The charge control agent may be internally added to the toner particle or may be externally added to the toner particle.

The amount of charge control agent addition is preferably from 0.2 mass parts to 10 mass parts per 100 mass parts of the binder resin.

Viewed from the standpoint of obtaining a stable image on a long-term basis, the toner may be used in the form of a two-component developer as obtained by mixing with a magnetic carrier.

A known magnetic carrier such as the following can be used for the magnetic carrier here: magnetic bodies, e.g., surface-oxidized iron powder; nonoxidized iron powder; metal particles such as those of iron, lithium, calcium, magnesium, nickel, copper, zinc, cobalt, manganese, chromium, and rare earths, as well as their alloy particles, oxide particles, and ferrites; and also magnetic body-dispersed resin carriers (referred to as resin carriers) containing a magnetic body and a binder resin that holds this magnetic body in a dispersed state.

Any production method may be used for the toner particle production method. Examples are methods in which the toner is directly produced in a hydrophilic medium, e.g., emulsion aggregation methods, dissolution suspension methods, and suspension polymerization methods. A pulverization method may also be used, and the toner yielded by a pulverization method may be subjected to thermal spheronizing.

Among the preceding, the effects described above are readily obtained with toner produced by emulsion aggregation. The reason for this is that during the production step the appearance of the polyester resin at the toner particle surface is facilitated. This is due to the following: in the emulsion aggregation method, the core particle is formed by the coalescence of an aggregated particle; the carboxyl groups, which are contained in the polyester resin and form the segments for bonding with the shell, readily emerge at the surface; and the adherence between the core and shell is made stronger.

A method of toner particle production by emulsion aggregation is provided as an example in the following.

Dispersion Preparation Step

The preparation will be described of a dispersion of resin particles for the purpose of producing resin particles that will function as core particles. The resin particle dispersion can be prepared, for example, proceeding as follows.

For the case in which the resin in the resin particles is a homopolymer or copolymer of vinyl monomer (vinyl resin), an ionic surfactant-supported dispersion of resin particles of a homopolymer or copolymer of vinyl monomer (vinyl resin) is prepared by, for example, the emulsion polymerization or seed polymerization of vinyl monomer in ionic surfactant.

For the case in which the resin in the resin particles is a resin other than a vinyl resin, e.g., is a polyester resin, this resin is mixed into an aqueous medium in which ionic surfactant or a polyelectrolyte is dissolved.

Dissolution is then brought about by heating this solution to at least the melting point or softening point, and a dispersion in which the resin particles are dispersed via the ionic surfactant is prepared using a powerful shear-force dispersing device, e.g., a homogenizer.

The dispersion means is not particularly limited and can be exemplified by dispersing devices that are themselves known, e.g., rotational shear-type homogenizers and media-based ball mills, sand mills, and Dyno mills.

The phase inversion emulsification method may also be used for the dispersion preparation method. The phase inversion emulsification method is a method in which the binder resin is dissolved in an organic solvent and a neutralizing agent and/or dispersion stabilizer is optionally added; an aqueous solvent is added dropwise while stirring to obtain emulsified particles; and the organic solvent in the resin dispersion is then removed to obtain an emulsion. The sequence of introduction for the neutralizing agent and/or dispersion stabilizer during this process may be varied.

The number-average particle diameter of the resin particles is generally not more than 1 μm and is preferably 0.01 to 1.00 μm. When the number-average particle diameter is in the indicated range, a sharp particle diameter distribution can be provided for the toner and the occurrence of free particles can be suppressed. In addition, the uneven toner-to-toner distribution of the resin particles is reduced, an excellent dispersion of the individual components in the toner is provided, and little scatter occurs in the properties and reliability.

A colorant particle dispersion may be prepared as necessary. This colorant particle dispersion is a colorant particle dispersion in which at least colorant particles are dispersed in a dispersing agent. The number-average particle diameter of the colorant particles is preferably not more than 0.5 μm and more preferably not more than 0.2 μm. When the number-average particle diameter is not more than 0.5 μm, the diffuse reflection of visible light can be prevented and in addition an excellent tinting strength, color reproducibility, and OHP transparency are provided. Moreover, uneven toner-to-toner distribution by the colorant is minimized, an excellent colorant dispersion in the toner is provided, and little scatter occurs in the properties and reliability.

A wax particle dispersion may be prepared as necessary. This wax particle dispersion is a wax particle dispersion in which at least wax particles are dispersed in a dispersing agent. The number-average particle diameter of the wax particles is preferably not more than 2.0 μm and more preferably not more than 1.0 μm. When the number-average particle diameter is in the indicated range, uneven toner-to-toner distribution by the wax is minimized, an excellent wax dispersion in the toner is provided, and little scatter occurs in the properties and reliability.

There are no particular limitations on the colorant particle+resin particle+wax particle combination, and this can be freely selected as appropriate in correspondence to the objectives.

A particle dispersion provided by the dispersion of appropriately selected particles in a dispersing agent may also be admixed in addition to the resin particle dispersion and colorant particle dispersion and wax particle dispersion.

The particles contained in this particle dispersion may be selected, without particular limitation, as appropriate in correspondence to the objectives, and examples here are internal additive particles, charge control agent particles, inorganic particles, and abrasive material particles. In addition, these particles may be dispersed in the resin particle dispersion and/or the colorant particle dispersion.

The dispersing agent present in, e.g., the resin particle dispersion, colorant particle dispersion, wax microdispersion, and particle dispersion, may be, for example, an aqueous medium that contains a polar surfactant.

The aqueous medium can be exemplified by alcohols and by water, e.g., distilled water, deionized water, and so forth. A single one of these may be used by itself or two or more may be used in combination. The content of the polar surfactant cannot be unconditionally stipulated and may be selected as appropriate in correspondence to the objectives.

The polar surfactant can be exemplified by anionic surfactants, e.g., sulfate ester salt types, sulfonate salt types, phosphate ester types, soaps, and so forth, and by cationic surfactants, e.g., amine salt types, quaternary ammonium salt types, and so forth.

The anionic surfactant can be specifically exemplified by sodium dodecylbenzenesulfonate, sodium dodecyl sulfate, sodium alkylnaphthalenesulfonate, and sodium dialkyl sulfosuccinate.

The cationic surfactant can be specifically exemplified by alkylbenzenedimethylammonium chloride, alkyltrimethylammonium chloride, and distearylammonium chloride. A single one of these may be used by itself, or two or more may be used in combination.

The polar surfactant may also be used in combination with a nonpolar surfactant. The nonpolar surfactant can be exemplified by nonionic surfactants such as polyethylene glycol types, alkylphenol/ethylene oxide adducts, and polyhydric alcohol types. The colorant particle content is preferably 0.1 mass parts to 30 mass parts per 100 mass parts of the resin component in the aggregated particle dispersion when the aggregated particles are formed.

The wax particle content, per 100 mass parts of the resin component in the aggregated particle dispersion when the aggregated particles are formed, is preferably 0.5 mass parts to 25 mass parts and more preferably 5 to 20 mass parts.

Formation of the aggregated particles may also be followed by the addition of charge control particles and resin particles in order to exercise a finer control of the charging performance of the resulting toner.

Measurement of the particle diameter of the resin particles, colorant particle dispersion, wax microdispersion, particle dispersion, and so forth is carried out using an LA-920 laser diffraction/scattering particle size distribution analyzer from Horiba, Ltd.

Aggregation Step

The aggregation step of forming aggregated particles is a step of forming—in an aqueous medium that contains at least resin particles and optionally contains colorant particles, wax particles, and so forth—aggregated particles that contain resin particles, colorant particles, wax particles, and so forth.

The aggregated particles, for example, can be formed in an aqueous medium by adding a pH regulator, aggregating agent, and stabilizer to the aqueous medium, mixing, and applying, e.g., temperature, mechanical power, and so forth, as appropriate.

The pH regulator can be exemplified by bases such as ammonia and sodium hydroxide and by acids such as nitric acid and citric acid. The aggregating agent can be exemplified by the salts of monovalent metals such as sodium and potassium; the salts of divalent metals such as calcium and magnesium; the salts of trivalent metals such as iron and aluminum; and alcohols such as methanol, ethanol, and propanol.

The stabilizer can be exemplified mainly by polar surfactants as such and by an aqueous medium containing same. For example, when the polar surfactant contained in the individual particle dispersion is anionic, a cationic one can be selected as the stabilizer.

The addition and mixing of the aggregating agent and so forth is preferably carried out at a temperature less than or equal to the glass transition temperature of the resin present in the aqueous medium. When mixing is carried out using this temperature condition, aggregation proceeds under stable conditions. Mixing can be carried out using, for example, a mixing device, homogenizer, mixer, and so forth which are themselves known.

It is also possible in the aggregation step to obtain aggregated particles having a core/shell structure, in which a shell is formed on the surface of the core aggregated particle, by forming a coating layer (the shell) by attaching a second resin particle to the aggregated particle surface using a resin particle dispersion that contains the second resin particle. The second resin particle used here may be the same as or may differ from the resin particle constituting the core aggregated particle. The aggregation step may be carried out repeatedly by division into a plurality of stages.

Fusion Step

The fusion step is a step in which melt-bonding is effected by heating the resulting aggregated particles. Prior to entry into the fusion step, for example, a pH regulator, polar surfactant, nonpolar surfactant, and so forth, may be introduced as appropriate in order to prevent toner particle-to-toner particle melt-adhesion.

The heating temperature should be at least as high as the glass transition temperature of the resin contained in the aggregated particle (when two or more species of resin are present, the glass transition temperature of the resin having the higher or highest glass transition temperature) and less than the decomposition temperature of the resin. The heating temperature will therefore vary depending on the resin species and thus cannot be unconditionally specified; however, it will generally be from at least the glass transition temperature of the resin contained in the aggregated particle to not more than 140° C. Heating can be carried out using a known heating device or heating equipment.

With regard to the duration of melt-bonding, shorter times will suffice at higher heating temperatures while longer times will be required at lower heating temperatures. Thus, the duration of fusion cannot be unconditionally specified because it depends on the heating temperature; however, it will generally be from 30 minutes to 10 hours.

Using known methods, the toner particle yielded via the execution of these individual steps can be recovered by solid-liquid separation followed by washing and drying under appropriate conditions, and so forth.

External Addition Step

The toner particle may be used as such as a toner. An external additive may be attached to the toner particle surface with the objective of imparting various properties to the toner. The toner preferably further comprises an external additive.

From the standpoint of the durability when added to the toner particle, the external additive preferably has a particle diameter not greater than one-tenth that of the average particle diameter of the toner particle prior to application of the external additive. The external additive can be exemplified by the following:

metal oxides such as aluminum oxide, titanium oxide, strontium titanate, cerium oxide, magnesium oxide, chromium oxide, tin oxide, and zinc oxide; nitrides such as silicon nitride; carbides such as silicon carbide; inorganic metal salts such as calcium sulfate, barium sulfate, and calcium carbonate; metal salts of fatty acids, such as zinc stearate and calcium stearate; and carbon black and silica. Silica is preferred among the preceding.

The content of the external additive per 100 mass parts of the toner particle is preferably from 0.01 mass parts to 10 mass parts and is more preferably from 0.05 mass parts to 5 mass parts. A single external additive may be used by itself or two or more may be used in combination. Considered from a charge stability standpoint, the use is preferred of an external additive that has been subjected to a surface hydrophobic treatment.

The hydrophobic treatment agent can be exemplified by silane coupling agents, e.g., methyltrimethoxysilane, methyltriethoxysilane, isobutyltrimethoxysilane, dimethyldimethoxysilane, dimethyldiethoxysilane, trimethylmethoxysilane, and hexamethylenedisilazane.

The methods for measuring the various properties are described in the following.

Measurement of the Surface Viscoelasticity of the Toner

A TI-950 System triboindenter (Hysitron Corporation) is used as the measurement instrumentation for measurement of the surface storage elastic modulus of the toner by a nanoindentation procedure.

For the measurement sample, operating in a 25° C. environment, the toner is taken up at the end of a cotton swab (Johnson & Johnson) and 0.1 mg of the toner is spread on a 1 cm×1 cm silicon wafer to give the sample that is used.

The sample is mounted on the sample chuck, and, operating at room temperature (25° C.), the measurement is begun using nanoindentation conditions and using a Berkovich diamond indenter (TI-0039, angle: 142.3°) (Hysitron Corporation).

Prior to beginning the measurement, the focus is established for the measurement sample, and it is important that the measurement be carried out under uniform focus conditions.

Focusing on the measurement sample is carried out with software using a microscope. Objective lens focusing is carried out sequentially from 5× to 20× and 50×. Adjustment is carried out after this with the 50× objective lens.

Calibration of the measurement space and loading force is then carried out using an Al plate accessory. Alignment of the Z-axis of the indenter is carried out by carrying out positional configuration between the tip of the indenter and the focus position of the microscope camera.

The tip of the indenter is then moved to above the toner-loaded silicon wafer and the microscope is focused on the toner that is the measurement target.

The measurement is carried out using the following conditions after the execution of these calibrations.

The indenter load condition is 30 and the load is applied at 0.5 μN/s from 0 to 30 μN. This is followed by measurement of the nanoviscoelasticity by the application of oscillation in the following sequence using the following frequencies and times: 3 seconds at 3.0 Hz, 5 seconds at 30 Hz, 15 seconds at 150 Hz, and 40 seconds at 301.5 Hz. The frequency changes are accompanied by the application of a stabilizing time of one second between the individual frequencies. 200 points at 100 pts/sec is used for the data plot count in this process, and the average value thereof is calculated.

The measurement is begun, and the calculations are carried out using frequency (Hz) for the horizontal axis and the storage elastic modulus (GPa) and loss elastic modulus (GPa) for the vertical axis.

This measurement is performed on 30 particles of the toner and the average value is used.

The measurement is always carried out with cleaning of the indenter (XY-axis alignment) with each particle.

Measurement using a load condition of 50 μN is performed just as for the load condition of 30 but applying the load at 0.5 μN/s from 0 μN to 50 μN.

Separation of Toner Particles from the Toner

When toner particles are used as the sample, the toner particles obtained by removing the external additive from the toner using the following method may also be used.

(1) 5 g of toner to which an external additive has been externally added, is introduced into a sample bottle and 200 mL of methanol is added. Several drops of surfactant are added as necessary. "Contaminon N" (a 10 mass % aqueous solution of a neutral pH 7 detergent for cleaning precision measurement instrumentation, comprising a nonionic surfactant, anionic surfactant, and organic builder, from Wako Pure Chemical Industries, Ltd.) can be used as the surfactant.

(2) The external additive is separated by dispersing the sample for 5 minutes using an ultrasound cleaner.

(3) The toner particles are separated from the external additive by suction filtration (10-μm membrane filter).

(4) The preceding (2) and (3) are carried out a total of three times.

A toner particle from which the external additive has been removed can be obtained from toner using this procedure.

Measurement of the Amount of Metal in the Toner Particle Cross Section

The polyvalent metal content is measured from the electron image of the toner particle cross section using the following method and a transmission electron microscope (TEM).

To prepare the measurement sample, toner particles are mixed with a visible light-curable embedding resin (D-800, Nisshin EM Co., Ltd.) and press-molding is carried out in a 25° C. environment using a tablet molder into a cylindrical shape having a diameter of 7.9 mm and a thickness of 1.0±0.3 mm to give a sample in which toner particles are embedded. Press-molding is carried out using conditions of 35 MPa and 60 seconds. Using an ultramicrotome (EM UC7, Leica) equipped with a diamond blade, thin-section samples with a film thickness of 100 nm are sliced from this sample at a slicing rate of 0.6 mm/s.

The toner particle cross section is observed at a magnification of 500,000× using these samples and a transmission electron microscope (TEM) (Model JEM2800, JEOL Ltd.) and conditions of an acceleration voltage of 200 keV and an electron beam probe size of 1 mm. Observation is carried out on those cross sections in which the long diameter is the weight-average particle diameter (D4)±10% for the toner particle under observation.

Using energy-dispersive x-ray spectroscopy (EDS:NSS, Thermo Electron Corporation), the spectrum is acquired for the constituent elements in the obtained toner particle cross sections. The range for R given in the following formula (1) is used for the range of spectrum acquisition.

The spectrum for the polyvalent metal P(M) is acquired by executing a line scan from an outline of the cross section of the toner particle having a shell thickness d (nm), toward a central part of the cross section in the direction perpendicular to the outline.

The shell thickness d in this measurement is measured as described below in "Measurement of the Average Value of the Shell Thickness". The average value of the shell thickness at 4 locations in the toner particle that is the measurement target is used as d (nm).

The shell is differentiated from the core particle by staining using osmium tetroxide, which selectively stains only the shell in the toner particle.

$$0.85d \leq R \leq 1.15d \quad \text{formula (1)}$$

Quantitative analysis is carried out from the resulting spectrum by the Cliff-Lorimer method for the value where the polyvalent metal peak value P(M) in formula (1) range is at a maximum, and the polyvalent metal content P(M) atomic % is calculated. P(M) atomic % is the atomic amount fraction using 100% for all the elements detected during analysis.

The Cliff-Lorimer method uses energy-dispersive x-ray spectroscopy (EDS:NSS, Thermo Electron Corporation). The calculations are carried out using a qualitative sensitivity of 5, an overvoltage of 1.5 keV, and the number 0 for the oxygen atom for the analytic conditions and carrying out a matrix correction that corrects for the influence of co-present elements.

This measurement is carried out on the cross sections of 20 particles of the toner and the resulting arithmetic average value is used.

Measurement of the Average Value of the Shell Thickness

To prepare the measurement sample, toner particles are mixed with a visible light-curable embedding resin (D-800, Nisshin EM Co., Ltd.) and press-molding is carried out in a 25° C. environment using a tablet molder into a cylindrical shape having a diameter of 7.9 mm and a thickness of 1.0±0.3 mm to give a sample in which toner particles are embedded. Press-molding is carried out using conditions of 35 MPa and 60 seconds.

Using an ultramicrotome (EM UC7, Leica) equipped with a diamond blade, thin-section samples with a film thickness of 100 nm are sliced from this sample at a slicing rate of 0.6 mm/s. The resulting samples are stained using osmium tetroxide. This procedure results in the selective staining of only the shell in the toner particle.

The cross section in the resulting thin-section sample is then imaged at 500,000× using a transmission electron microscope (TEM) (Model JEM2800, JEOL Ltd.) and conditions of an acceleration voltage of 200 keV and an electron beam probe size of 1 mm. The shell thickness is measured by analyzing the TEM image using image analysis software.

Specifically, two orthogonal straight lines are drawn at approximately the center of the toner particle cross section and the shell thickness is measured at each of the four locations where these two straight lines intersect the shell. The arithmetic average value of the thickness measured at the four locations is taken to be the shell thickness of the particular toner particle. The shell thickness is measured on each of 20 particles of the, and the number-average value of the measured thicknesses is used as the evaluation value (average shell thickness) for the toner that is the target of the measurement.

Method for Measuring the Weight-Average Particle Diameter (D4) of the Toner Particle The weight-average particle diameter (D4) of the toner particle is determined by carrying out the measurements in 25,000 channels for the number of effective measurement channels and performing analysis of the measurement data, using a "Coulter Counter Multisizer 3" (registered trademark, Beckman Coulter, Inc.), a precision particle size distribution measurement instrument operating on the pore electrical resistance method and equipped with a 100-μm aperture tube, and using the accompanying dedicated software, i.e., "Beckman Coulter Multisizer 3 Version 3.51" (Beckman Coulter, Inc.), to set the measurement conditions and analyze the measurement data.

The aqueous electrolyte solution used for the measurements is prepared by dissolving special-grade sodium chloride in deionized water to provide a concentration of approximately 1 mass % and, for example, "ISOTON II" (Beckman Coulter, Inc.) can be used.

The dedicated software is configured as follows prior to measurement and analysis.

In the "modify the standard operating method (SOM)" screen in the dedicated software, the total count number in the control mode is set to 50,000 particles; the number of measurements is set to 1 time; and the Kd value is set to the value obtained using "standard particle 10.0 μm" (Beckman Coulter, Inc.). The threshold value and noise level are automatically set by pressing the threshold value/noise level measurement button. In addition, the current is set to 1,600 μA; the gain is set to 2; the electrolyte solution is set to ISOTON II; and a check is entered for the post-measurement aperture tube flush.

In the "setting conversion from pulses to particle diameter" screen of the dedicated software, the bin interval is set to logarithmic particle diameter; the particle diameter bin is set to 256 particle diameter bins; and the particle diameter range is set to from 2 μm to 60 μm.

The specific measurement procedure is as follows.

(1) Approximately 200 mL of the above-described aqueous electrolyte solution is introduced into a 250-mL roundbottom glass beaker intended for use with the Multisizer 3 and this is placed in the sample stand and counterclockwise stirring with the stirrer rod is carried out at 24 rotations per second. Contamination and air bubbles within the aperture tube are preliminarily removed by the "aperture tube flush" function of the dedicated software.

(2) Approximately 30 mL of the aqueous electrolyte solution is introduced into a 100-mL flatbottom glass beaker. To this is added approximately 0.3 mL of the following dilution as a dispersing agent.

Dilution: dilution prepared by the three-fold (mass) dilution with deionized water of "Contaminon N" (a 10 mass % aqueous solution of a neutral pH 7 detergent for cleaning precision measurement instrumentation, comprising a nonionic surfactant, anionic surfactant, and organic builder, from Wako Pure Chemical Industries, Ltd.)

(3) A prescribed amount of deionized water is introduced into the water tank of the ultrasound disperser indicated below, which has an electrical output of 120 W and is equipped with two oscillators (oscillation frequency=50 kHz) disposed such that the phases are displaced by 180°, and approximately 2 mL of Contaminon N is added to this water tank.

Ultrasound disperser: "Ultrasonic Dispersion System Tetora 150" (Nikkaki Bios Co., Ltd.)

(4) The beaker described in (2) is set into the beaker holder opening on the ultrasound disperser and the ultrasound disperser is started. The vertical position of the beaker is adjusted in such a manner that the resonance condition of the surface of the aqueous electrolyte solution within the beaker is at a maximum.

(5) While the aqueous electrolyte solution within the beaker set up according to (4) is being irradiated with ultrasound, approximately 10 mg of the toner is added to the aqueous electrolyte solution in small aliquots and dispersion is carried out. The ultrasound dispersion treatment is continued for an additional 60 seconds. The water temperature in the water tank is controlled as appropriate during ultrasound dispersion to be from 15° C. to 40° C.

(6) Using a pipette, the dispersed toner-containing aqueous electrolyte solution prepared in (5) is dripped into the roundbottom beaker set in the sample stand as described in (1) with adjustment to provide a measurement concentration of approximately 5%. Measurement is then performed until the number of measured particles reaches 50,000.

(7) The measurement data is analyzed by the dedicated software provided with the instrument and the weight-average particle diameter (D4) is calculated. When set to graph/volume % with the dedicated software, the "average diameter" on the analysis/volumetric statistical value (arithmetic average) screen is the weight-average particle diameter (D4).

Method for Measuring the Acid Value of the Resins

The acid value is the number of milligrams of potassium hydroxide required to neutralize the acid present in 1 g of a sample. The acid value of the resins is measured in accordance with JIS K 0070-1992, and is specifically measured using the following procedure.

(1) Reagent Preparation

A phenolphthalein solution is obtained by dissolving 1.0 g of phenolphthalein in 90 mL of ethyl alcohol (95 volume %) and bringing to 100 mL by adding deionized water.

7 g of special-grade potassium hydroxide is dissolved in 5 mL of water and this is brought to 1 L by the addition of ethyl alcohol (95 volume %). This is introduced into an alkali-resistant container avoiding contact with, for example, carbon dioxide, and is allowed to stand for 3 days, after which time filtration is carried out to obtain a potassium hydroxide solution. The obtained potassium hydroxide solution is stored in an alkali-resistant container. The factor for this potassium hydroxide solution is determined from the amount of the potassium hydroxide solution required for neutralization when 25 mL of 0.1 mol/L hydrochloric acid is introduced into an Erlenmeyer flask, several drops of the phenolphthalein solution are added, and titration is performed using the potassium hydroxide solution. The 0.1 mol/L hydrochloric acid used is prepared in accordance with JIS K 8001-1998.

(2) Procedure (A) Main Test 2.0 g of the sample is exactly weighed into a 200-mL Erlenmeyer flask and 100 mL of a toluene/ethanol (2:1) mixed solution is added and dissolution is carried out over 5 hours. Several drops of the phenolphthalein solution are added as indicator and titration is performed using the potassium hydroxide solution. The titration endpoint is taken to be the persistence of the faint pink color of the indicator for approximately 30 seconds.

(B) Blank Test

The same titration as in the above procedure is run, but without using the sample (that is, with only the toluene/ethanol (2:1) mixed solution).

(3) The Acid Value is Calculated by Substituting the Obtained Results into the Following Formula.

$$A=[(C-B)\times f\times 5.61]/S$$

Here, A: acid value (mg KOH/g); B: amount (mL) of addition of the potassium hydroxide solution in the blank test; C: amount (mL) of addition of the potassium hydroxide solution in the main test; f: factor for the potassium hydroxide solution; and S: mass of the sample (g).

Measurement of the Glass Transition Temperature (Tg) of the Resins

The Tg of the resins is measured using a differential scanning calorimeter (DSC measurement instrument).

A "Q1000" differential scanning calorimetric analyzer (trade name, TA Instruments) is used as the differential scanning calorimeter, and the measurement is carried out as follows in conformity with ASTM D 3418-82. 3 mg of the measurement sample (resin) is accurately weighed out. This is introduced into an aluminum pan, and an empty aluminum pan is used for reference. After holding for equilibration for 5 minutes at 20° C., the measurement is performed in the temperature range from 20° C. to 180° C. at a ramp rate of 10° C./min. The glass transition temperature is determined by the midpoint method.

EXAMPLES

The present invention is more specifically described herebelow using examples. The present invention is not limited by the examples that follow. The number of parts and the % in the examples and comparative examples are on a mass basis in all instances unless specifically indicated otherwise.

Production of Core Particle Polyester Resin 1

The monomers in the amounts of addition given in Table 1 were introduced into a reactor equipped with a nitrogen introduction line, water separation tube, stirrer, and thermocouple, and 1.5 parts of dibutyltin for each 100 parts of the total amount of monomer was subsequently added as catalyst. The temperature was then quickly raised to 180° C. at normal pressure under a nitrogen atmosphere, followed by carrying out a polycondensation while distilling out water and heating from 180° C. to 210° C. at a rate of 10° C./hour.

Heating to a temperature of 210° C. was then carried out and, while reducing the pressure, the reaction was run until the desired molecular weight was reached to provide polyester resin 1.

Production of Core Particle Polyester Resins 2 to 5

Polyester resins 2 to 5 were prepared using the same production method as for polyester resin 1, but changing the starting materials as shown in Table 1.

The unit for Tg is ° C. The abbreviations used in the table expand as follows.

TPA: terephthalic acid

IPA: isophthalic acid

TMA: trimellitic acid

BPA-PO: 2 mol propylene oxide adduct on bisphenol A

BPA-EO: 2 mol ethylene oxide adduct on bisphenol A

TABLE 1

| | Monomer composition: charged (molar ratio) | | | | | Resin properties | |
|---|---|---|---|---|---|---|---|
| Polyester | Acid | | | Alcohol | | Tg | Acid value |
| resin | TPA | IPA | TMA | BPA-PO | BPA-EO | (° C.) | mgKOH/g |
| Polyester resin 1 | 40 | 3 | 5 | 43 | 9 | 77.5 | 6 |
| Polyester resin 2 | 40 | 2 | 2.5 | 60 | 0 | 73.0 | 2 |
| Polyester resin 3 | 40 | 0 | 2.5 | 59 | 0 | 73.5 | 2 |
| Polyester resin 4 | 41 | 3 | 7.5 | 40 | 8 | 78.0 | 15 |
| Polyester resin 5 | 41 | 3 | 9 | 40 | 8 | 78.5 | 18 |

Production of Core Particle Styrene-Acrylic Resin 80.0 parts of styrene, 20.0 parts of n-butyl acrylate, and 0.3 parts of hexanediol diacrylate were added to a reactor fitted with a stirrer, thermometer, and nitrogen introduction line and were heated to a temperature of 80° C. while stirring.

2.0 parts of Perbutyl 0 (10-hour half-life temperature of 72.1° C. (NOF Corporation)) was then added as polymerization initiator and a polymerization was run for 5 hours to obtain a styrene-acrylic resin for use for the core particle.

Production of Shell Dispersion 1

300 parts of deionized water was added to a 1-L three-neck flask equipped with a thermometer and stirring blade; dilute hydrochloric acid was added to adjust the pH to 4; and the temperature was held at 30° C. The monomer shown in Table 2 in the amount of addition also shown in Table 2 was added to this solution having a pH adjusted to 4, and dispersion was carried out to yield a shell dispersion 1.

Production Example for Shell Dispersions 2 to 5

Shell dispersions 2 to 5 were obtained proceeding as in the production example for shell dispersion 1, but changing the monomer composition as indicated in Table 2.

TABLE 2

| Shell dispersion | Monomer | Charged (parts) |
|---|---|---|
| Shell dispersion 1 | Hexamethylolmelamine | 30.0 |
| Shell dispersion 2 | Benzoguanamine | 50.0 |
| Shell dispersion 3 | Aniline | 50.0 |
| Shell dispersion 4 | Methylolated urea | 70.0 |
| Shell dispersion 5 | Phenol | 30.0 |

Preparation of Polyester Resin Particle Dispersion

| | |
|---|---|
| polyester resin 1 | 200 parts |
| deionized water | 500 parts |

These materials were introduced into a stainless steel vessel; heating to 95° C. and melting were carried out on a hot bath; and, while thoroughly stirring at 7,800 rpm using a homogenizer (Ultra-Turrax T50, IKA), the pH was brought to above 7.0 by the addition of 0.1 mol/L sodium bicarbonate.

A polyester resin particle dispersion was then obtained by the gradual dropwise addition of a mixed solution of 3 parts of sodium dodecylbenzenesulfonate and 297 parts of deionized water while emulsifying and dispersing. When the particle size distribution of this polyester resin particle dispersion 1 was measured using a particle size distribution analyzer (LA-920, Horiba, Ltd.), the number-average particle diameter of the contained polyester resin particles was 0.25 μm and coarse particles exceeding 1 μm were not observed.

Preparation of Styrene-Acrylic Resin Particle Dispersion 300 parts of xylene (boiling point 144° C.) was introduced into a flask that could be pressurized and could be placed under reduced pressure, thorough substitution of the interior of the vessel with nitrogen was carried out while stirring, and reflux was established by heating.

A mixture of

| | |
|---|---|
| styrene | 88.50 parts |
| methyl methacrylate | 2.50 parts |
| 2-hydroxyethyl methacrylate | 5.00 parts |
| methacrylic acid | 4.00 parts |
| di-tert-butyl peroxide | 2.00 parts |

was added under this reflux and a polymerization was then run for 5 hours at 175° C. for the polymerization temperature and 0.100 MPa for the pressure during the reaction. After this, a solvent-removal procedure was run for 3 hours under reduced pressure to remove the xylene, and pulverization then yielded a styrene-acrylic resin 1.

The styrene-acrylic resin particle dispersion was obtained proceeding as in (Preparation of Polyester Resin Particle Dispersion) using the styrene-acrylic resin 1 in place of the polyester resin 1.

Preparation of Wax Particle Dispersion

| | |
|---|---|
| deionized water | 500 parts |
| wax | 250 parts (hydrocarbon wax; temperature at which endothermic peak is a maximum = 77° C.) |

These materials were introduced into a stainless steel vessel; heating to 95° C. and melting were carried out on a hot bath; and, while thoroughly stirring at 7,800 rpm using a homogenizer (Ultra-Turrax T50, IKA), the pH was brought to above 7.0 by the addition of 0.1 mol/L sodium bicarbonate.

A mixed solution of 5 parts of sodium dodecylbenzenesulfonate and 245 parts of deionized water was then gradually added dropwise while emulsifying and dispersing. When the particle size distribution of the wax particles present in this wax particle dispersion was measured using a particle size distribution analyzer (LA-920, Horiba, Ltd.), the number-average particle diameter of the contained wax particles was 0.35 μm and coarse particles exceeding 1 μm were not observed.

Preparation of Colorant Particle Dispersion 1

| | |
|---|---|
| C.I. Pigment Blue 15:3 | 100 parts |
| sodium dodecylbenzenesulfonate | 5 parts |
| deionized water | 400 parts |

The preceding were mixed and were dispersed using a sand grinder mill. When the particle size distribution of the colorant particles contained in this colorant particle dispersion was measured using a particle size distribution analyzer (LA-920, Horiba, Ltd.), the number-average particle diameter of the contained colorant particles was 0.2 μm and coarse particles exceeding 1 μm were not observed.

Preparation of Colorant Particle Dispersion 2

| | |
|---|---|
| C.I. Pigment Red 122 | 100 parts |
| sodium dodecylbenzenesulfonate | 5 parts |
| deionized water | 400 parts |

The preceding were mixed and were dispersed using a sand grinder mill. When the particle size distribution of the colorant particles contained in this colorant particle dispersion was measured using a particle size distribution analyzer (LA-920, Horiba, Ltd.), the number-average particle diameter of the contained colorant particles was 0.2 μm and coarse particles exceeding 1 μm were not observed.

Preparation of Colorant Particle Dispersion 3

| | |
|---|---|
| C.I. Pigment Yellow 74 | 100 parts |
| sodium dodecylbenzenesulfonate | 5 parts |
| deionized water | 400 parts |

The preceding were mixed and were dispersed using a sand grinder mill. When the particle size distribution of the colorant particles contained in this colorant particle dispersion was measured using a particle size distribution analyzer (LA-920, Horiba, Ltd.), the number-average particle diameter of the contained colorant particles was 0.2 μm and coarse particles exceeding 1 μm were not observed.

Toner 1 Production

Core Particle 1 Production

| | |
|---|---|
| polyester resin particle dispersion | 450 parts |
| styrene-acrylic resin particle dispersion | 50 parts |
| colorant particle dispersion 1 | 50 parts |
| wax particle dispersion | 50 parts |
| sodium dodecylbenzenesulfonate | 5 parts |

The polyester resin particle dispersion, the styrene-acrylic resin particle dispersion, the wax particle dispersion, and the sodium dodecylbenzenesulfonate were introduced into a reactor (flask with a 1 liter capacity, baffle equipped, anchor impeller) and were mixed to uniformity. The colorant particle dispersion 1 was separately mixed to uniformity in a 500-mL beaker, and this was gradually added to the reactor while stirring to provide a mixed dispersion. While stirring the obtained mixed dispersion, 0.5 parts as solids of an aqueous aluminum sulfate solution was added dropwise to bring about the formation of aggregated particles.

After completion of the dropwise addition, the interior of the system was substituted using nitrogen and holding was carried out for 1 hour at 50° C. and for an additional 1 hour at 55° C.

Heating was then carried out and holding was performed for 30 minutes at 90° C. This was followed by cooling to 63° C. and then holding for 3 hours to form coalesced particles. The reaction during this sequence was carried out under a nitrogen atmosphere. After the prescribed time had elapsed, cooling was carried out to room temperature at a ramp down rate of 0.5° C. per minute.

After cooling, the reaction product was subjected to solid-liquid separation at a pressure of 0.4 MPa using a 10-L pressure filter to obtain a toner cake. This was followed by the addition of deionized water to the pressure filter to its full capacity and washing was performed at a pressure of 0.4 MPa. Washing was performed in this manner a total of three times. The resulting toner cake was dispersed in 1,000 parts of a methanol/water 50:50 mixed solvent in which 0.15 parts nonionic surfactant had been dissolved, to yield a surface-treated core particle dispersion.

This core particle dispersion was poured into a pressure filter and another 5 L of deionized water was added. This was followed by solid-liquid separation at a pressure of 0.4 MPa and then fluid bed drying at 45° C. to yield a core particle 1.

Toner Particle 1 Production

The shell dispersion 1 was added, so as to provide 1.0 parts resin solids, to 100.0 parts as solids of the core particle 1 dispersion. The pH was then adjusted to 8.0 by the addition of an aqueous sodium hydroxide solution at room temperature (approximately 25° C.) while stirring at a rotation rate condition of 200 rpm. The temperature was subsequently raised to 70° C. and a shell layer was formed on the core particle surface by stirring for 2 hours.

The toner particle dispersion was then adjusted to pH 7 (neutrality) using hydrochloric acid and the toner particle dispersion was cooled to room temperature. After this, the calcium phosphate dispersing agent was dissolved by the addition of hydrochloric acid, and filtration, washing with water, and drying then gave a toner particle 1 having a core-shell structure and having a weight-average particle diameter (D4) of 6.9 μm.

Toner 1 Production 100.0 parts of toner particle 1 was mixed for 3 minutes with 1.5 parts of dry silica particles ("AEROSIL (registered trademark) REA90", positive-charging hydrophobed silica particles, Nippon Aerosil Co., Ltd.) using an FM mixer (Nippon Coke & Engineering Co., Ltd.) to attach the silica particles to toner particle 1. This was followed by sieving on a 300 mesh (aperture=48 μm) to yield toner 1. The properties of the obtained toner 1 are given in Table 4.

Production of Toners 2 to 19 and 22 to 29

Toners 2 to 19 and 22 to 29 were obtained by the same production method as used for toner 1, but with the changes shown in Table 3. The aluminum sulfate aggregating agent was changed to calcium chloride for toner 14, to magnesium chloride for toner 15, and to sodium chloride for toner 22. The properties are given in Table 4.

Toner 20 Production

Core Particle 20 Production

| | |
|---|---|
| polyester resin 1 | 60.0 parts |
| core particle styrene-acrylic resin | 40.0 parts |
| C.I. Pigment Blue 15:3 (copper phthalocyanine) | 5.0 parts |
| ester wax (behenyl behenate: melting point = 72° C.) | 15.0 parts |
| Fischer-Tropsch wax | 2.0 parts (C105, Sasol Limited, melting point: 105° C.) |

-continued

| | |
|---|---|
| methyl ethyl ketone | 100.0 parts |
| ethyl acetate | 100.0 parts |

These materials were dispersed for 3 hours using an attritor (Mitsui Mining & Smelting Co., Ltd.) to obtain a colorant dispersion.

Otherwise, an aqueous medium was prepared by adding 1.8 parts of magnesium hydroxide to 300.0 parts of deionized water heated to a temperature of 60° C. and stirring at a stirring rate of 10,000 rpm using a TK Homomixer (Tokushu Kika Kogyo Co., Ltd.). The colorant dispersion was introduced into this aqueous medium and colorant particle granulation was performed by stirring, at a temperature of 65° C. in an N2 atmosphere, for 15 minutes at a stirring rate of 12,000 rpm using a TK Homomixer.

The TK Homomixer was changed over to an ordinary propeller stirrer. The stirring rate with the stirrer was held at 150 rpm; the internal temperature was raised to a temperature of 95° C.; and the solvent was removed from the dispersion by holding for 3 hours to prepare a core particle 20 dispersion.

Toner Particle 20 Production

The shell dispersion 1 was added, so as to provide 1.0 parts resin solids, to 100.0 parts as solids of the core particle 20 dispersion. The pH was then adjusted to 8.0 by the addition of an aqueous sodium hydroxide solution at room temperature (approximately 25° C.) while stirring at a rotation rate condition of 200 rpm. The temperature was subsequently raised to 70° C. and a shell layer was formed on the core particle surface by stirring for 2 hours.

The toner particle dispersion was then adjusted to pH 7 (neutrality) using hydrochloric acid and the toner particle dispersion was cooled to room temperature. After this, the calcium phosphate dispersing agent was dissolved by the addition of hydrochloric acid, and filtration, washing with water, and drying then gave a toner particle 20 having a core-shell structure and having a weight-average particle diameter (D4) of 6.9 μm.

Toner 20 Production 100.0 parts of toner particle 20 was mixed for 3 minutes with 1.5 parts of dry silica particles ("AEROSIL (registered trademark) REA90", positive-charging hydrophobed silica particles, Nippon Aerosil Co., Ltd.) using an FM mixer (Nippon Coke & Engineering Co., Ltd.) to attach the silica particles to toner particle 20. This was followed by sieving on a 300 mesh (aperture=48 μm) to yield toner 20. The above evaluation was carried out using the toner 20, and the obtained properties are given in Table 4.

Toner 21 Production

Core Particle 21 Production

| | |
|---|---|
| polyester resin 1: | 60.0 parts |
| core particle styrene-acrylic resin | 40.0 parts |
| C.I. Pigment Blue 15:3 (copper phthalocyanine): | 5.0 parts |
| ester wax (behenyl behenate: melting point = 72° C.) | 15.0 parts |
| Fischer-Tropsch wax: | 2.0 parts (C105, Sasol Limited, melting point: 105° C.) |

These materials were preliminarily mixed using a Mitsui Henschel mixer (Mitsui Miike Chemical Engineering Machinery Co., Ltd.), followed by melt-kneading using a twin-screw extruder (product name: PCM-30, Ikegai Ironworks Corporation) with the temperature set to provide a melt temperature at the outlet of 140° C.

The resulting kneaded material was cooled and coarsely pulverized using a hammer mill and was then pulverized using a pulverizer (product name: Turbo Mill T250, Turbo Kogyo Co., Ltd.). The resulting finely pulverized powder was classified using a Coanda effect-based multi-grade classifier to yield a core particle 21 having a weight-average particle diameter (D4) of 6.8 μm.

Toner 21 Production 100.0 parts of toner particle 21 was mixed for 3 minutes with 1.5 parts of dry silica particles ("AEROSIL (registered trademark) REA90", positive-charging hydrophobed silica particles, Nippon Aerosil Co., Ltd.) using an FM mixer (Nippon Coke & Engineering Co., Ltd.) to attach the silica particles to toner particle 21. This was followed by sieving on a 300 mesh (aperture=48 μm) to yield toner 21. The above evaluation was carried out using the toner 21, and the obtained properties are given in Table 4.

TABLE 3

| | Core resin | | | | Polyvalent metal | | Shell | | | |
|---|---|---|---|---|---|---|---|---|---|---|
| | Core resin 1 | Parts | Core resin 2 | Parts | Metal | Parts | Shell resin | Parts | Reaction temperature (° C.) | pH |
| Toner 1 | Polyester resin 1 | 90.0 | Styrene-acrylic resin | 10.0 | Al | 0.5 | Shell 1 | 1.0 | 70 | 8.0 |
| Toner 2 | Polyester resin 1 | 60.0 | Styrene-acrylic resin | 40.0 | Al | 0.5 | Shell 1 | 1.0 | 70 | 8.0 |
| Toner 3 | Polyester resin 1 | 60.0 | Styrene-acrylic resin | 40.0 | Al | 0.5 | Shell 1 | 1.0 | 73 | 8.0 |
| Toner 4 | Polyester resin 1 | 60.0 | Styrene-acrylic resin | 40.0 | Al | 0.5 | Shell 1 | 1.0 | 66 | 8.0 |
| Toner 5 | Polyester resin 1 | 60.0 | Styrene-acrylic resin | 40.0 | Al | 0.005 | Shell 1 | 1.0 | 70 | 8.0 |
| Toner 6 | Polyester resin 1 | 60.0 | Styrene-acrylic resin | 40.0 | Al | 3.0 | Shell 1 | 1.0 | 70 | 8.0 |
| Toner 7 | Polyester resin 2 | 60.0 | Styrene-acrylic resin | 40.0 | Al | 0.5 | Shell 1 | 1.0 | 70 | 8.0 |
| Toner 8 | Polyester resin 3 | 60.0 | Styrene-acrylic resin | 40.0 | Al | 0.5 | Shell 1 | 1.0 | 70 | 8.0 |
| Toner 9 | Polyester resin 4 | 60.0 | Styrene-acrylic resin | 40.0 | Al | 0.5 | Shell 1 | 1.0 | 70 | 8.0 |
| Toner 10 | Polyester resin 5 | 60.0 | Styrene-acrylic resin | 40.0 | Al | 0.5 | Shell 1 | 1.0 | 70 | 8.0 |
| Toner 11 | Polyester resin 1 | 60.0 | Styrene-acrylic resin | 40.0 | Al | 0.5 | Shell 2 | 1.0 | 70 | 8.0 |
| Toner 12 | Polyester resin 1 | 60.0 | Styrene-acrylic resin | 40.0 | Al | 0.5 | Shell 3 | 1.5 | 70 | 8.0 |
| Toner 13 | Polyester resin 1 | 60.0 | Styrene-acrylic resin | 40.0 | Al | 0.5 | Shell 4 | 3.0 | 70 | 8.0 |
| Toner 14 | Polyester resin 1 | 60.0 | Styrene-acrylic resin | 40.0 | Ca | 0.5 | Shell 1 | 1.0 | 70 | 8.0 |
| Toner 15 | Polyester resin 1 | 60.0 | Styrene-acrylic resin | 40.0 | Mg | 0.5 | Shell 1 | 1.0 | 70 | 8.0 |
| Toner 16 | Polyester resin 1 | 60.0 | Styrene-acrylic resin | 40.0 | Al | 0.5 | Shell 1 | 0.025 | 70 | 8.0 |
| Toner 17 | Polyester resin 1 | 60.0 | Styrene-acrylic resin | 40.0 | Al | 0.5 | Shell 1 | 0.05 | 70 | 8.0 |
| Toner 18 | Polyester resin 1 | 60.0 | Styrene-acrylic resin | 40.0 | Al | 0.5 | Shell 1 | 1.4 | 70 | 8.0 |
| Toner 19 | Polyester resin 1 | 60.0 | Styrene-acrylic resin | 40.0 | Al | 0.5 | Shell 1 | 2.5 | 70 | 8.0 |
| Toner 20 | Polyester resin 1 | 60.0 | Styrene-acrylic resin | 40.0 | Mg | 0.5 | Shell 1 | 1.0 | 70 | 8.0 |
| Toner 21 | Polyester resin 1 | 60.0 | Styrene-acrylic resin | 40.0 | Ca | 0.5 | Shell 1 | 1.0 | 70 | 8.0 |
| Toner 22 | Polyester resin 1 | 60.0 | Styrene-acrylic resin | 40.0 | — | 0.0 | Shell 1 | 1.0 | 70 | 8.0 |
| Toner 23 | Polyester resin 1 | 0.0 | Styrene-acrylic resin | 100.0 | Al | 0.5 | Shell 1 | 1.0 | 70 | 8.0 |
| Toner 24 | Polyester resin 1 | 60.0 | Styrene-acrylic resin | 40.0 | Al | 0.5 | Shell 5 | 1.0 | 70 | 8.0 |
| Toner 25 | Polyester resin 1 | 60.0 | Styrene-acrylic resin | 40.0 | Al | 0.0008 | Shell 1 | 1.0 | 70 | 8.0 |
| Toner 26 | Polyester resin 1 | 60.0 | Styrene-acrylic resin | 40.0 | Al | 7.8 | Shell 1 | 1.0 | 70 | 8.0 |
| Toner 27 | Polyester resin 1 | 60.0 | Styrene-acrylic resin | 40.0 | Al | 0.5 | Shell 1 | 1.0 | 78 | 8.0 |
| Toner 28 | Polyester resin 1 | 60.0 | Styrene-acrylic resin | 40.0 | Al | 0.5 | Shell 1 | 1.0 | 63 | 8.0 |
| Toner 29 | Polyester resin 1 | 60.0 | Styrene-acrylic resin | 40.0 | Al | 0.5 | Shell 1 | 1.0 | 70 | 4.0 |

Toner Particle 21 Production

An aqueous medium was prepared by adding 1.8 parts of tricalcium phosphate to 250.0 parts of deionized water heated to a temperature of 40° C. and stirring at a stirring rate of 15,000 rpm using a T. K. Homomixer (Tokushu Kika Kogyo Co., Ltd.).

The shell dispersion 1 was added, so as to provide 1.0 parts resin solids, to 100.0 parts as solids of the core particle 21 dispersion. The pH was then adjusted to 8.0 by the addition of an aqueous sodium hydroxide solution at room temperature (approximately 25° C.) while stirring at a rotation rate condition of 200 rpm. The temperature was subsequently raised to 70° C. and a shell layer was formed on the core particle surface by stirring for 2 hours.

The toner particle dispersion was then adjusted to pH 7 (neutrality) using hydrochloric acid and the toner particle dispersion was cooled to room temperature. After this, the calcium phosphate dispersing agent was dissolved by the addition of hydrochloric acid, and filtration, washing with water, and drying then gave a toner particle 21 having a core-shell structure and having a weight-average particle diameter (D4) of 6.9 μm.

TABLE 4

| | Toner properties | | | |
|---|---|---|---|---|
| | Metal content | Storage elastic modulus at 30 μN (GPa) | Storage elastic modulus at 50 μN (GPa) | Shell thickness |
| Toner 1 | 0.3200 | 8.12 | 3.62 | 10.5 |
| Toner 2 | 0.2900 | 8.01 | 3.53 | 10.2 |
| Toner 3 | 0.2100 | 6.83 | 3.51 | 9.6 |
| Toner 4 | 0.3800 | 11.60 | 3.73 | 11.0 |
| Toner 5 | 0.0012 | 7.86 | 3.51 | 9.7 |
| Toner 6 | 1.9400 | 8.49 | 3.89 | 10.8 |
| Toner 7 | 0.3000 | 8.16 | 0.14 | 9.9 |
| Toner 8 | 0.3100 | 8.14 | 0.38 | 10.1 |
| Toner 9 | 0.3400 | 9.01 | 11.60 | 10.1 |
| Toner 10 | 0.3400 | 9.62 | 15.10 | 10.2 |
| Toner 11 | 0.3300 | 8.02 | 3.51 | 10.3 |
| Toner 12 | 0.3500 | 7.98 | 3.46 | 10.3 |
| Toner 13 | 0.3100 | 7.81 | 3.44 | 9.9 |
| Toner 14 | 0.4800 | 8.03 | 3.71 | 10.2 |
| Toner 15 | 0.4700 | 7.99 | 3.69 | 9.8 |
| Toner 16 | 0.2500 | 6.96 | 3.12 | 0.5 |
| Toner 17 | 0.2900 | 7.02 | 3.26 | 1.1 |
| Toner 18 | 0.5200 | 10.96 | 4.81 | 28.3 |
| Toner 19 | 0.4900 | 11.89 | 4.83 | 50.2 |
| Toner 20 | 0.3600 | 8.01 | 4.18 | 10.6 |

TABLE 4-continued

| | Toner properties | | | |
|---|---|---|---|---|
| | Metal content | Storage elastic modulus at 30 μN (GPa) | Storage elastic modulus at 50 μN (GPa) | Shell thickness |
| Toner 21 | 0.3300 | 7.95 | 2.10 | 10.2 |
| Toner 22 | 0.0000 | 6.21 | 2.98 | 9.3 |
| Toner 23 | 0.2700 | 6.13 | 2.01 | 8.6 |
| Toner 24 | 0.3100 | 4.23 | 3.71 | 10.1 |
| Toner 25 | 0.0005 | 5.21 | 3.55 | 9.4 |
| Toner 26 | 5.1000 | 12.86 | 4.96 | 11.8 |
| Toner 27 | 0.2600 | 3.72 | 3.68 | 8.3 |
| Toner 28 | 0.5100 | 14.20 | 5.01 | 12.2 |
| Toner 29 | 0.3300 | 3.81 | 3.22 | 10.2 |

In the table, the metal content refers to the polyvalent metal content P(M) (atomic %). The storage elastic modulus at 30 μN is "the surface storage elastic modulus of the toner at a load of 30 μN at 25° C.". The storage elastic modulus at 50 is "the surface storage elastic modulus of the toner at a load of 50 μN at 25° C.". The shell thickness is the average value (nm) of the shell thickness.

Image Evaluations

A color laser beam printer (HP LaserJet Enterprise Color M652n) from Hewlett-Packard was used as the image-forming apparatus; it was modified to have a process speed of 400 mm/sec. A Genuine HP 656X LaserJet toner cartridge (cyan) was used for the cartridge.

The product toner was removed from the cartridge, followed by cleaning with an air blower and filling with 300 g of the toner to be evaluated. The following evaluations were performed using the aforementioned image-forming apparatus and this cartridge.

Fogging

The fogging was evaluated in a high-temperature, high-humidity environment (30° C./80% RH). XEROX 4200 paper (75 g/m$^2$, Xerox Corporation) was used for the evaluation paper.

Operating in the high-temperature, high-humidity environment, 20,000 prints were made in an intermittent durability printing test in which two prints were output every four seconds of a character E image having a print percentage of 1%.

After this, a solid white image was output, and Dr-Ds was used for the fogging value where Ds is the poorest value of the reflection density in the white background area and Dr is the average reflection density of the transfer material before image formation.

The reflection density of the white background area was measured using a reflection densitometer (Reflectometer Model TC-6DS, Tokyo Denshoku Co., Ltd.) and using an amber light filter for the filter.

A better fogging level is indicated by smaller numerical values. The evaluation criteria are as follows.

Evaluation Criteria

A: less than 0.5%

B: equal to or greater than 0.5% and less than 1.5%

C: equal to or greater than 1.5% and less than 3.0%

D: equal to or greater than 3.0%

Development Streaks (Developing Performance)

Development streaks are approximately 0.5-mm vertical streaks that are produced due to crushing and cracking of the toner, and are an image defect that is readily seen when a full-surface halftone image is output.

The development streak evaluation was performed in a low-temperature, low-humidity environment (15° C./10% RH).

XEROX 4200 paper (75 g/m$^2$, Xerox Corporation) was used for the evaluation paper.

Operating in the low-temperature, low-humidity environment, 20,000 prints were made in an intermittent durability printing test in which two prints were output every four seconds of a character E image having a print percentage of 1%. A full-surface halftone image was then output and inspected for the presence/absence of vertical streaks. The results are given in Table 5.

Evaluation Criteria

A: no production

B: development streaks are produced at from one to three locations

C: development streaks are produced at from four to six locations

D: development streaks are produced at seven or more locations, or a development streak with a width of 0.5 mm or more is produced Fixing Performance A solid image (toner laid-on level: 0.9 mg/cm$^2$) was printed on the transfer material at different fixation temperatures and evaluation was carried out using the criteria given below. This fixation temperature is the value measured for the fixing roller surface using a noncontact thermometer. Letter-size plain paper (XEROX 4200, 75 g/m$^2$, Xerox Corporation) was used for the transfer material.

Evaluation Criteria

A: offset is not produced at 140° C.

B: offset is produced at 140° C.

C: offset is produced at 150° C.

D: offset is produced at 160° C.

Blocking (Storability)

5 g of each particular toner was placed in a 50-mL plastic cup; this was allowed to stand for 3 days at temperature=55° C./humidity=10% RH; and the presence/absence of clumping was then checked and was evaluated using the following criteria.

Evaluation Criteria

A: clumps are not produced

B: slight clumping is produced and is broken up by lightly pressing with a finger C: clumps are produced and are not broken up even by lightly pressing with a finger D: complete aggregation

Examples 1 to 21

The evaluations indicated above were performed in Examples 1 to 21 respectively using each of toners 1 to 21 for the toner. The results of the evaluations are given in Table 5.

Comparative Examples 1 to 8

The evaluations indicated above were performed in Comparative Examples 1 to 8 respectively using each of toners 22 to 29 for the toner. The results of the evaluations are given in Table 5.

TABLE 5

| | | Results of the development evaluations | | | |
|---|---|---|---|---|---|
| | | Fogging | Development streaks | Stor-ability | Fixing performance |
| Example 1 | Toner 1 | A 0.3% | A | A | A |
| Example 2 | Toner 2 | A 0.3% | A | A | A |
| Example 3 | Toner 3 | A 0.4% | A | A | A |
| Example 4 | Toner 4 | A 0.3% | A | A | A |
| Example 5 | Toner 5 | A 0.4% | A | A | A |
| Example 6 | Toner 6 | A 0.3% | A | A | A |
| Example 7 | Toner 7 | C 1.8% | C | A | A |
| Example 8 | Toner 8 | A 0.4% | A | A | A |
| Example 9 | Toner 9 | A 0.3% | A | A | A |
| Example 10 | Toner 10 | B 1.2% | B | A | C |
| Example 11 | Toner 11 | B 0.5% | A | A | A |
| Example 12 | Toner 12 | B 0.7% | A | B | A |
| Example 13 | Toner 13 | B 1.0% | B | B | A |
| Example 14 | Toner 14 | B 0.6% | A | A | A |
| Example 15 | Toner 15 | B 0.8% | B | A | A |
| Example 16 | Toner 16 | B 1.3% | C | C | A |
| Example 17 | Toner 17 | A 0.4% | A | A | A |
| Example 18 | Toner 18 | A 0.4% | A | A | A |
| Example 19 | Toner 19 | A 0.4% | A | A | C |
| Example 20 | Toner 20 | B 0.8% | B | A | C |
| Example 21 | Toner 21 | B 0.6% | A | C | A |
| Comparative Example 1 | Toner 22 | D 5.2% | D | A | A |
| Comparative Example 2 | Toner 23 | D 3.8% | D | C | A |
| Comparative Example 3 | Toner 24 | D 3.6% | D | A | A |
| Comparative Example 4 | Toner 25 | D 4.9% | D | A | A |
| Comparative Example 5 | Toner 26 | A 0.4% | B | A | D |
| Comparative Example 6 | Toner 27 | D 4.1% | D | B | A |
| Comparative Example 7 | Toner 28 | C 2.3% | C | A | D |
| Comparative Example 8 | Toner 29 | D 4.8% | D | C | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-185497, filed Nov. 6, 2020, which is hereby incorporated by reference herein in its entirety.

What is claimed is:

1. A toner, comprising:

a toner particle comprising a core particle, a shell coating a surface of the core particle, and a polyvalent metal;

the core particle comprising a polyester resin; and the shell comprising an amino resin, wherein in an electron image of a cross section of the toner particle acquired using a transmission electron microscope, the polyvalent metal has a content P (M) of 0.0010 to 2.0000 atomic %, according to energy-dispersive x-ray analysis during an execution of a line scan in a range of 0.85d to 1.15d from an outline of the cross section of the toner particle toward a central part of the cross section in a direction perpendicular to the outline, where d (nm) is a thickness of the shell; and a surface storage elastic modulus of the toner at a load of 30 μN at 25° C. is 6.50 to 12.00 GPa, according to nanoindentation measurement of the toner.

2. The toner according to claim 1, wherein a surface storage elastic modulus of the toner at a load of 50 μN at 25° C. is 0.20 to 12.00 GPa, according to nanoindentation measurement of the toner.

3. The toner according to claim 1, wherein the amino resin is a thermosetting resin.

4. The toner according to claim 1, wherein the amino resin is at least one member selected from the group consisting of melamine resins, urea resins, guanamine resins and aniline resins.

5. The toner according to claim 1, wherein the polyvalent metal is at least one member selected from the group consisting of Al, Mg and Ca.

6. The toner according to claim 1, wherein the shell has an average thickness of 1.0 to 30.0 nm.

7. The toner according to claim 1, wherein the polyvalent metal is Mg derived from magnesium hydroxide.

8. The toner according to claim 1, wherein the polyvalent metal is Al derived from aluminum sulfate.

9. The toner according to claim 1, wherein the polyvalent metal is Mg derived from magnesium chloride.

10. The toner according to claim 1, wherein the toner further comprises an external additive.

11. The toner according to claim 1, wherein the amino resin is a melamine resin.

* * * * *